(12) United States Patent
Guest

(10) Patent No.: US 7,758,085 B2
(45) Date of Patent: Jul. 20, 2010

(54) TUBE COUPLINGS

(75) Inventor: Timothy Steven Guest, Bray (GB)

(73) Assignee: John Guest International Limited, West Drayton, Middlesex (GB)

( * ) Notice: Subject to any disclaimer, the term of this patent is extended or adjusted under 35 U.S.C. 154(b) by 0 days.

(21) Appl. No.: 12/270,450

(22) Filed: Nov. 13, 2008

(65) Prior Publication Data

US 2009/0140514 A1 Jun. 4, 2009

(30) Foreign Application Priority Data

Dec. 3, 2007 (GB) ................... 0723646.6

(51) Int. Cl.
*F16L 21/06* (2006.01)
(52) U.S. Cl. ...................... 285/322; 285/243
(58) Field of Classification Search ............... 285/243, 285/257, 322
See application file for complete search history.

(56) References Cited

U.S. PATENT DOCUMENTS

| | | |
|---|---|---|
| 4,005,883 A | 2/1977 | Guest |
| 4,573,716 A | 3/1986 | Guest |
| 4,606,783 A | 8/1986 | Guest |
| 4,637,636 A | 1/1987 | Guest |
| 4,645,246 A | 2/1987 | Guest |
| 4,650,529 A | 3/1987 | Guest |
| 4,657,286 A | 4/1987 | Guest |
| 4,722,560 A | 2/1988 | Guest |
| 4,804,213 A | 2/1989 | Guest |
| 4,923,220 A | 5/1990 | Guest |
| 4,946,213 A | 8/1990 | Guest |
| 4,958,858 A | 9/1990 | Guest |
| 5,370,423 A | 12/1994 | Guest |
| 5,390,969 A | 2/1995 | Guest |
| 5,401,064 A | 3/1995 | Guest |
| 5,443,289 A | 8/1995 | Guest |
| 5,468,027 A | 11/1995 | Guest |
| 5,607,190 A * | 3/1997 | Exandier et al. .............. 285/93 |
| 5,607,193 A | 3/1997 | Guest |
| 5,683,121 A | 11/1997 | Guest |
| 5,738,387 A | 4/1998 | Guest |
| 5,775,742 A | 7/1998 | Guest |
| 5,779,284 A | 7/1998 | Guest |
| 5,915,738 A | 6/1999 | Guest |

(Continued)

FOREIGN PATENT DOCUMENTS

EP  0 551 755 A1  7/1993

(Continued)

*Primary Examiner*—Aaron M Dunwoody
*Assistant Examiner*—Fannie Kee
(74) *Attorney, Agent, or Firm*—Workman Nydegger

(57) ABSTRACT

A tube coupling for receiving and holding an end of a tube includes a coupling body having a hollow stem adapted to engage in a tube to be secured to the coupling body. A cap is mounted on the coupling body and encircles the stem with a gap between the cap and stem to receive the tube engaged over the stem. A tube locking device is located in the cap for locking the tube against withdrawal from the stem and a locking ring is located on the stem within the cap. The ring has both inwardly and outwardly projecting teeth for engaging respectively the inner and outer surfaces of the cap and stem to lock the cap on the stem.

17 Claims, 3 Drawing Sheets

U.S. PATENT DOCUMENTS

| | | |
|---|---|---|
| 6,056,326 A | 5/2000 | Guest |
| 6,173,999 B1 | 1/2001 | Guest |
| 6,283,443 B1 * | 9/2001 | Taneya .................... 251/149.6 |
| 6,439,620 B1 | 8/2002 | Guest |
| 6,467,816 B1 * | 10/2002 | Huang ........................ 285/316 |
| 6,557,904 B2 * | 5/2003 | Naito ........................ 285/316 |
| 6,863,314 B2 | 3/2005 | Guest |
| 6,880,865 B2 | 4/2005 | Guest |
| RE38,786 E | 8/2005 | Guest |
| 6,929,289 B1 | 8/2005 | Guest |
| 6,957,833 B2 | 10/2005 | Guest |
| 7,032,932 B2 | 4/2006 | Guest |
| 7,082,957 B2 | 8/2006 | Guest |
| 7,100,948 B2 | 9/2006 | Guest |
| 2002/0109353 A1 | 8/2002 | Guest |
| 2003/0201641 A1 | 10/2003 | Guest |
| 2005/0006896 A1 * | 1/2005 | Naito et al. ................. 285/316 |
| 2006/0181080 A1 | 8/2006 | Guest |
| 2006/0202478 A1 | 9/2006 | Guest |
| 2007/0034255 A1 | 2/2007 | Guest |
| 2007/0034817 A1 | 2/2007 | Guest |
| 2007/0194568 A1 | 8/2007 | Guest |
| 2007/0200344 A1 | 8/2007 | Guest |
| 2008/136166 A1 | 6/2008 | Guest |

FOREIGN PATENT DOCUMENTS

| | | |
|---|---|---|
| EP | 0 702 184 A1 | 3/1996 |
| EP | 1 821 021 A2 | 8/2007 |
| WO | WO 2006/037971 A1 | 4/2006 |

* cited by examiner

TUBE COUPLINGS

CROSS-REFERENCE TO RELATED APPLICATIONS

This application claims the priority of United Kingdom Application Serial No. 0723646.6, filed Dec. 3, 2007, which is incorporated herein by specific reference.

BACKGROUND OF THE INVENTION

1. The Field of the Invention

This invention relates to tube couplings for connecting flexible tubes or conduits for carrying gases, liquids or cables together.

2. The Relevant Technology

European Patent Publication No. 0702184 discloses a grab ring comprising an annular element having one set of teeth projecting outwardly at an inclined angle to the annular element to one side thereof and a second set of teeth projecting inwardly at an inclined angle to the annular element to the other side thereof to engage between a pair of inner and outer concentric cylindrical surfaces to permit relative movement between the surfaces in one direction thus preventing relative movement in the opposite direction. More specifically, the grab ring may be used to lock a tubular element in an encircling counter bore in a coupling body for a tube coupling. The grab ring may be located to one side of an "O" ring seal for the tube to be mounted in the counter bore or the grab ring may be embodied in the "O" ring seal.

SUMMARY OF THE INVENTION

The invention provides a tube coupling for receiving and holding an end of a tube comprising a coupling body having a hollow stem is adapted to engage in a tube to be secured to the coupling body, a cap mounted on the coupling body and encircling the stem with a gap between the cap and stem to receive a tube engaged over the stem, a tube locking device in the cap for locking the tube against withdrawal from the stem and a locking ring located on the stem within the cap, the ring having both inwardly and outwardly projecting teeth for engaging respectively the inner and outer surfaces of the cap and stem to lock the cap on the stem.

Preferably the stem has an enlarged diameter portion adjacent the head to receive the locking ring.

More specifically the locking ring is moulded in plastics and embodies a grab ring having both inwardly and outwardly projecting teeth to engage the inner surface of the cap and the outer surface of the stem respectively.

For example, the ring may have cylindrical inner and outer surfaces and the outer teeth of the grab ring project beyond the outer surface to engage in the cap and the inner teeth project beyond the inner surface to engage the step.

In that arrangement the ring may be recessed adjacent the sides of the outer teeth facing the head of the coupling body to allow the teeth to flex towards the head as the cap is pressed over the ring so that the teeth press against the inner surface of the cap to grip the cap.

Further the ring may be recessed adjacent the sides of the inner teeth facing away from the head of the coupling body to allow the teeth to flex away from the head as the rig is located on the stem so that the teeth press against the outer surface of the stem to grip the stem.

In any of the above arrangements the stem may have encircling recess adjacent said one end to receive an O-ring seal for sealing with the inner surface of the tube inserted over the stem.

Also in any of the above arrangements the cap may have an internal taper towards the open end of the cap remote from the head and the tube locking device comprises a collet having a head with axially extending teeth projecting into the cap, the teeth engaging between the tapered surface on the inside of the cap and the tube to lock the tube to the stem to prevent withdrawal of the tube from the stem.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
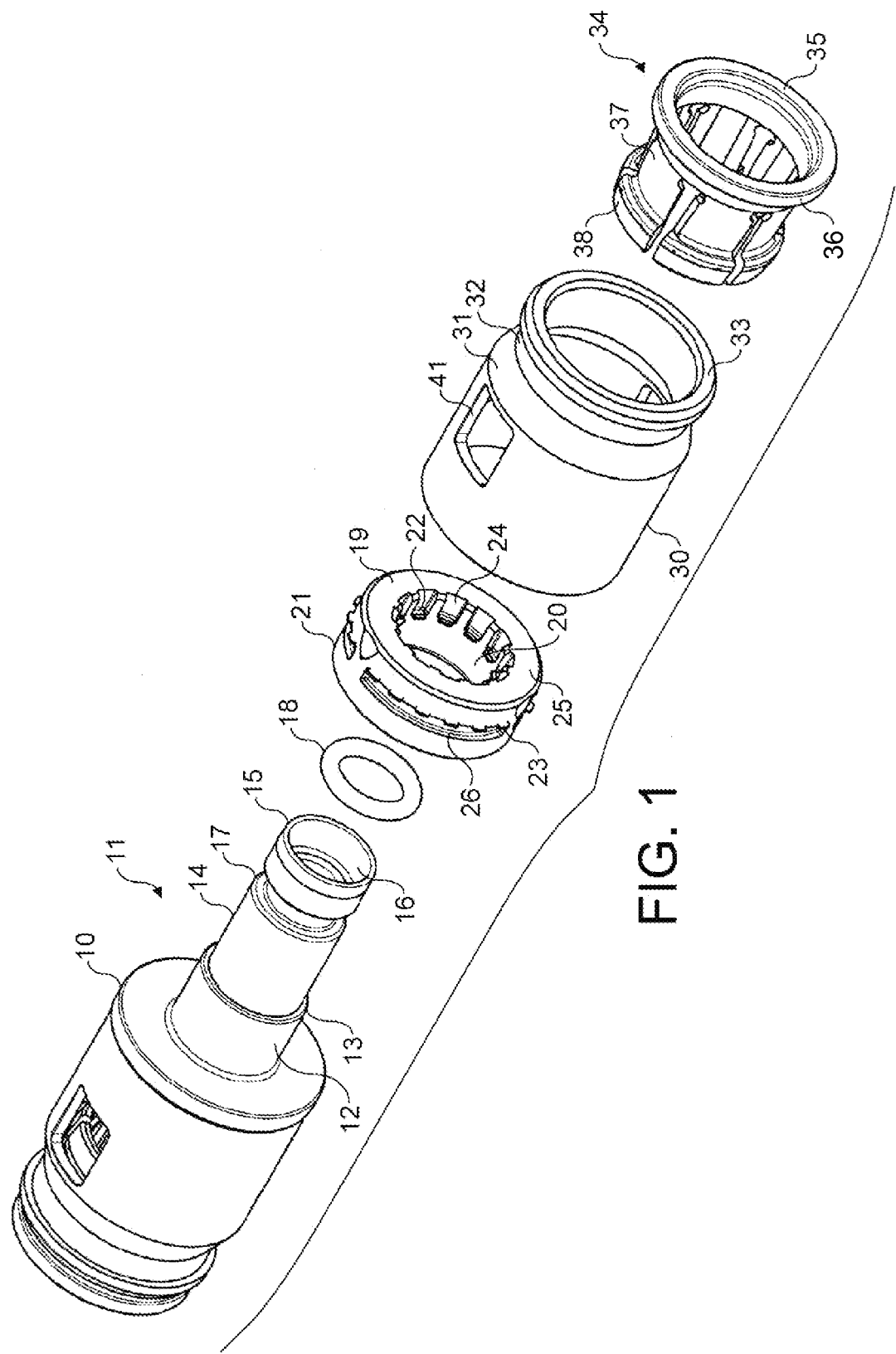
FIG. 1 is a perspective view of an inline coupling body for connecting two tubes together, one end of the coupling body being shown fully assembled and the other end of the coupling body having its components shown exploded apart.

The drawings show an inline double ended tube coupling body for connecting a pair of tubes together. The tubes may be flexible tubes or may be rigid conduit and may be used for an air or gas line or for carrying liquid such as water, beverages or fuels or hydraulic fluids.

The coupling body comprises a shallow circular head 10 having hollow stems 11 formed coaxially with and projecting on either side of the head. Each stem has an enlarged diameter portion 12 for receiving an annular locking ring which will be described later. The enlarged portion 12 is connected by a shallow step 13 to a main stem portion 14 for receiving the end of a tube to be coupled to the coupling body. The stem terminates in an end face 15 and has a throughway 16 running through the stem, head 10 and stem on the other side of the head for flow of fluid between the tubes connected to the coupling body.

The main portion 14 of the stem has an annular groove 17 located adjacent the end of the stem to receive an O-ring seal 18 for sealing on the inside surface of a tube to be located on the stem.

A moulded plastics locking ring 19 is provided for insertion over the stem onto the enlarged portion 12 of the stem adjacent the head 10. The locking ring has cylindrical inner and outer faces 20, 21 and a steel grab ring is moulded into the locking ring having one set of radially inwardly projecting teeth 22 for gripping the enlarged portion 12 of the stem and a set of radially outwardly projecting teeth 23 for engaging in a cap to be located over the stem as described later.

Channel shaped recesses 24 are formed around the inner face 20 of the ring 19 extending between the radial teeth 22 and the side 25 of the ring disposed away from the head 10. The channels provide spaces adjacent the teeth into which the teeth can flex as the ring 19 is forced onto the enlarged portion of the stem 12 so that when the ring has been positioned adjacent the head 10, the flexing of the teeth 22 causes the edges of the teeth to engage and grip the surface of the enlarged portion of the stem to resist withdrawal of the ring from the stem.

The outer face 21 of the ring is formed with four arcuate slots 26 on the side of the teeth 23 adjacent the head 10 to provide space into which the teeth 23 can flex.

A moulded plastics cap 30 having a main body of cylindrical form is located over the stem 11 of the coupling body and is held in place by the projecting teeth 23 on the outer side of the locking ring 19 which are flexed towards the head 10 as the cap is forced over the locking ring. The resulting flexing of the teeth presses against the inside surface of the cap to resist withdrawal of the cap from the locking ring and stem.

The cap 30 is of generally uniform wall thickness and has a tapered portion 31 adjacent the end of the cap remote from the head which terminates in cylindrical portion 32 with a flared entry 33.

A moulded plastics collet indicated generally at 34 is located in the cap, the collet having a head 35 which lies outside the entry 33 to the cap, a short annular part 36 and a plurality of flexible legs 37 extending axially from the annular part and terminating in arcuate heads 38 which have metal teeth 39 moulded into the heads and projecting on the inner sides of the heads to engage the outer surface of a tube inserted through the collet cap and onto the stem 14.

Figure 2:
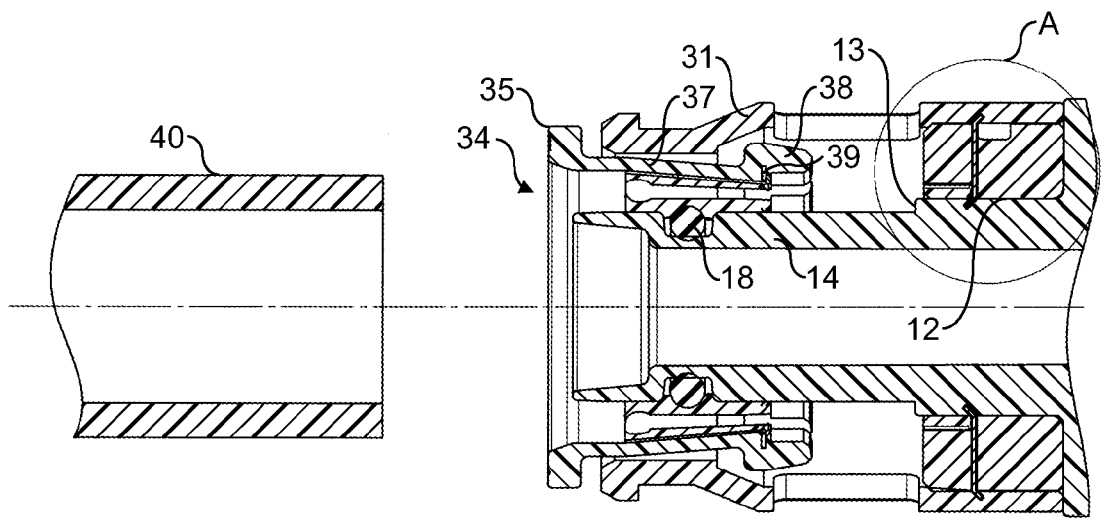
FIG. 2 is a sectional view through one end of the coupling body with the components shown fully assembled and with a tube located adjacent the open end of the coupling body for insertion into the coupling body.

Referring now to FIG. 2 of the drawings which shows an assembled version of the coupling body, the collet 34 can be seen located in the open end of the cap with the heads 38 on the arms 37 of the collet engageable with the inside face of the tapered section 31 of the cap so that as the collet is drawn out of the cap, the teeth are pressed inwardly to engage the outer surface of a tube extending through the collet.

A tube to be locked in the coupling body is shown at 40 and is located in line with the passage into the coupling body ready for insertion.

Figure 3:
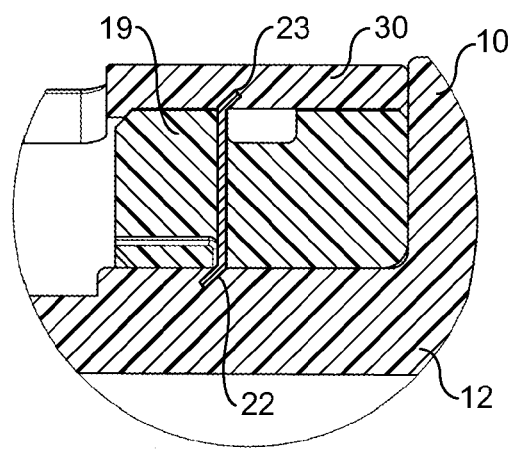
FIG. 3 is an enlarged view of the area designated detail A on FIG. 2.

The enlarged area designated detail A is shown in FIG. 3 where the locking ring 19 can be seen located on the enlarged portion 12 of the stem with the teeth 22 projecting on the inner side of the locking ring 19 engaging the surface of the stem to resist withdrawal of the locking ring from the stem and the teeth 23 on the outer side of the locking ring engaging on the inner surface of the cap 30 to prevent the cap from being withdrawn.

The cap 30 is formed with a pair of diametrically opposed rectangular windows 41 for viewing inside the assembly to enable the operator to be sure that a tube has been fully inserted onto the stem 14 and is held in place by the collet 34.

The coupling body and stem form a single moulded plastics unit as does the locking ring 19, the cap 30 and the collet 34 with the grab ring in the locking ring 19 being formed from stainless steel and the teeth incorporated in the heads of the collet also being formed from stainless steel. Alternatively the coupling body could be formed in metal and in the case where the connector is to have a connection on one side as described above and a threaded connection on the other side, metal would be the preferred material.

The cap may, as indicated above, be formed from moulded plastics or may be formed from metal. The collet form locking device for locking a tube in the cap may be replaced by a number of other forms of locking devices such as a grab ring.

The inwardly and outwardly projecting teeth on the locking ring 19 are formed to extend radially outwardly and radially inwardly as manufactured. Alternatively the teeth can be pre-bent in the appropriate directions for locking the cap to the outer side of the locking ring and locking the inner side of the ring onto the stem.

The cap, locking ring and collet can be supplied as a unit or cartridge for location on the stem of a coupling body or unit provided by a customer.

It will be appreciated that the tube coupling provides a flexible and simple arrangement for connecting tubes together. It will be noted that the coupling body has a diameter only a little in excess of the diameter of the tube to be coupled to the coupling body and the arrangement provides a clean and simple design appearance.

Figure 4:
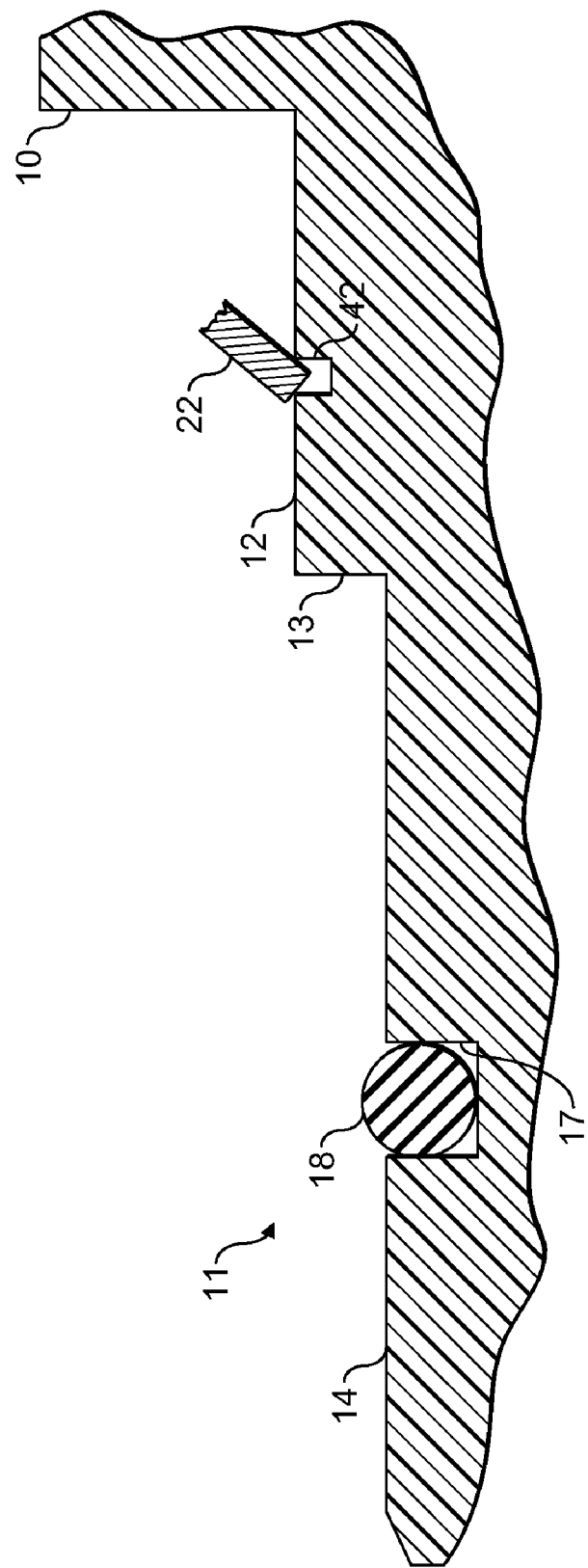
FIG. 4 shows a modified form of the coupling body.

Reference is now made to FIG. 4 of the drawings which shows a modified form of stem 11 for the coupling in which an annular groove 42 is formed in the enlarged portion 12 of the stem adjacent head 10 in which the inwardly projecting teeth 22 of locking ring 19 can engage when the ring is located over the stem. The arrangement prevents the ring from "unwinding" with rotation from the stem.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tube coupling configured to receive and secure an end of a tube, the tube coupling comprising:
   a coupling body having a head and a hollow stem projecting longitudinally from the head, the stem being adapted to engage in a tube when the tube is received by the tube coupling;
   a cap mounted on the head of the coupling body and encircling the stem, a gap being formed between the cap and the stem, the gap being configured to receive the tube when the tube is received by the tube coupling;
   a tube locking device at least partially positioned within the cap, the tube locking device being separate and discrete from the cap and being movable longitudinally with respect to the cap, the tube locking device being configured to lock the tube against withdrawal from the stem when the tube is received by the tube coupling; and
   a locking ring located on the stem within the cap, the locking ring having both inwardly and outwardly projecting teeth, the inwardly projecting teeth engaging the outer surface of the stem and the outwardly projecting teeth engaging the inner surface of the cap, thereby locking the cap on the stem.

2. A tube coupling as claimed in claim 1, wherein the stem has an enlarged diameter portion adjacent the head of the coupling body to receive the locking ring.

3. A tube coupling as claimed in claim 1, wherein the locking ring is moulded in plastics and embodies a grab ring having the inwardly and outwardly projecting teeth that engage the outer surface of the stem and the inner surface of the cap respectively.

4. A tube coupling as claimed in claim 3, wherein the grab ring has cylindrical inner and outer surfaces and the outwardly projecting teeth of the grab ring project beyond the outer surface to engage in the cap and the inwardly projecting teeth project beyond the inner surface to engage the stem.

5. A tube coupling as claimed in claim 4 wherein the grab ring is recessed adjacent sides of the outwardly projecting teeth facing the head of the coupling body to allow the outwardly projecting teeth to flex towards the head of the coupling body as the cap is pressed over the grab ring so that the outwardly projecting teeth press against the inner surface of the cap to grip the cap.

6. A tube coupling as claimed in claim 4, wherein the grab ring is recessed adjacent sides of the inwardly projecting teeth facing away from the head of the coupling body to allow the inwardly projecting teeth to flex away from the head of the coupling body as the grab ring is located on the stem so that the inwardly projecting teeth press against the outer surface of the stem to grip the stem.

7. A tube coupling as claimed in claim 1, wherein the stem has an encircling recess adjacent a distal end remote from the coupling body to receive an O-ring seal for sealing with the inner surface of the tube inserted over the stem.

8. A tube coupling as claimed in claim 1, wherein the cap has an internal taper towards an end of the cap remote from the head and the tube locking device comprises a collet having a head with axially extending teeth projecting into the cap, the axially extending teeth being configured to engage between the tapered surface on the inside of the cap and the tube to lock the tube to the stem to prevent withdrawal of the tube from the stem when the tube is received by the tube coupling.

9. A tube coupling as claimed in claim 1, wherein the stem has an annular encircling groove on which the inwardly projecting teeth of the locking ring engage to hold the ring on the stem when the tube is received by the tube coupling.

10. A tube coupling as claimed in claim 1, wherein the tube locking device is rotatable about the longitudinal axis with respect to the cap.

11. A tube coupling as claimed in claim 1, wherein the tube locking device is configured to engage between the inner surface of the cap and an outer surface of the tube to lock the tube against withdrawal from the stem when the tube is received by the tube coupling.

12. A tube coupling as claimed in claim 1, wherein the tube coupling is configured to receive and secure an end of a second tube, and wherein the coupling body further comprises a second hollow stem projecting from the head, the second stem being adapted to engage in the second tube when the second tube is received by the tube coupling.

13. A tube coupling configured to couple a first tube to a second tube, the tube coupling comprising:

a coupling body comprising a head, a first stem adapted to engage in the first tube when the first tube is received by the tube coupling, and a second stem adapted to engage in the second tube when the second tube is received by the tube coupling, the first and second stems each having an inner surface and an opposing outer surface, the inner surface bounding a passageway extending longitudinally therethrough, each stem projecting in opposite longitudinal directions from the head;

a first cap having an inner surface encircling the first stem, the first cap being configured to receive the first tube when the first tube is received by the tube coupling;

a first tube locking device at least partially positioned within the first cap, the first tube locking device being adapted to lock the first tube against withdrawal from the first stem when the first tube is received by the tube coupling; and a first locking ring positioned between the first cap and the first stem, the first locking ring comprising inwardly projecting teeth that engage the outer surface of the first stem and outwardly projecting teeth that engage the inner surface of the first cap, thereby securing the first cap on the first stem;

a second cap having an inner surface encircling the second stem, the second cap being configured to receive the second tube when the second tube is received by the tube coupling;

a second tube locking device at least partially positioned within the second cap, the second tube locking device being adapted to lock the second tube against withdrawal from the second stem when the second tube is received by the tube coupling; and a second locking ring positioned between the second cap and the second stem, the second locking ring comprising inwardly projecting teeth that engage the outer surface of the second stem and outwardly projecting teeth that engage the inner surface of the second cap, thereby securing the second cap on the second stem.

14. A tube coupling as claimed in claim 13, wherein the first locking ring has a cylindrical inner surface and a cylindrical outer surface and the outwardly projecting teeth of the first locking ring project beyond the outer surface and the inwardly projecting teeth of the first locking ring project beyond the inner surface.

15. A tube coupling as claimed in claim 14 wherein the first locking ring is recessed adjacent sides of the outwardly projecting teeth to allow the outwardly projecting teeth to flex towards the head of the coupling body as the first cap is pressed over the first locking ring.

16. A tube coupling as claimed in claim 14, wherein the first locking ring is recessed adjacent sides of the inwardly projecting teeth to allow the inwardly projecting teeth to flex away from the head of the coupling body when the first locking ring is positioned on the stem.

17. A tube coupling as claimed in claim 13, wherein the first tube locking device comprises a collet having a head with axially extending teeth, the axially extending teeth projecting into the first cap and being configured to engage between the inner surface of the first cap and an outer surface of the first tube when the first tube is received by the tube coupling.

* * * * *

UNITED STATES PATENT AND TRADEMARK OFFICE
CERTIFICATE OF CORRECTION

Page 1 of 1

PATENT NO.      : 7,758,085 B2
APPLICATION NO. : 12/270450
DATED           : July 20, 2010
INVENTOR(S)     : Guest It is certified that error appears in the above-identified patent and that said Letters Patent is hereby corrected as shown below:

Column 1
Line 35, after "hollow stem" remove [is]
Line 64, after "have" insert --an--

Column 2
Line 34, change "conduit" to --conduits--

Column 3
Line 25, change "stem 14" to --stem 11--
Line 48, change "stem 14" to --stem 11--

Signed and Sealed this
Fourteenth Day of June, 2011

David J. Kappos
*Director of the United States Patent and Trademark Office*